United States Patent [19]
Spencer

[11] 3,797,741
[45] Mar. 19, 1974

[54] INTERMITTENT IRRIGATION SYSTEM
[76] Inventor: Lloyd Spencer, 220 Patrician Way, Pasadena, Calif. 91105
[22] Filed: Jan. 18, 1973
[21] Appl. No.: 324,589

[52] U.S. Cl............ 239/11, 138/45, 239/70, 239/542
[51] Int. Cl............................................. B05b 1/30
[58] Field of Search............ 239/11, 67, 69, 70, 99, 239/542, 547; 138/44, 45, 46

[56] References Cited
UNITED STATES PATENTS

| | | | |
|---|---|---|---|
| 3,669,352 | 6/1972 | Zaphiris | 239/70 |
| 3,628,730 | 12/1971 | Nelson | 239/11 X |
| 3,027,094 | 3/1962 | Phillips | 239/67 X |
| 3,199,784 | 8/1965 | Chapin | 239/547 X |

Primary Examiner—Allen N. Knowles
Assistant Examiner—Michael Y. Mar

[57] ABSTRACT

An irrigation system having a plurality of emitter openings, each dimensioned to discharge water at a rate in excess of that required for drip or trickle irrigation, and a control means which permits intermittent flow for short intervals from the emitters to the effect that during the irrigation period the average flow corresponds to the continuous flow rate from a drip irrigation system.

17 Claims, 20 Drawing Figures

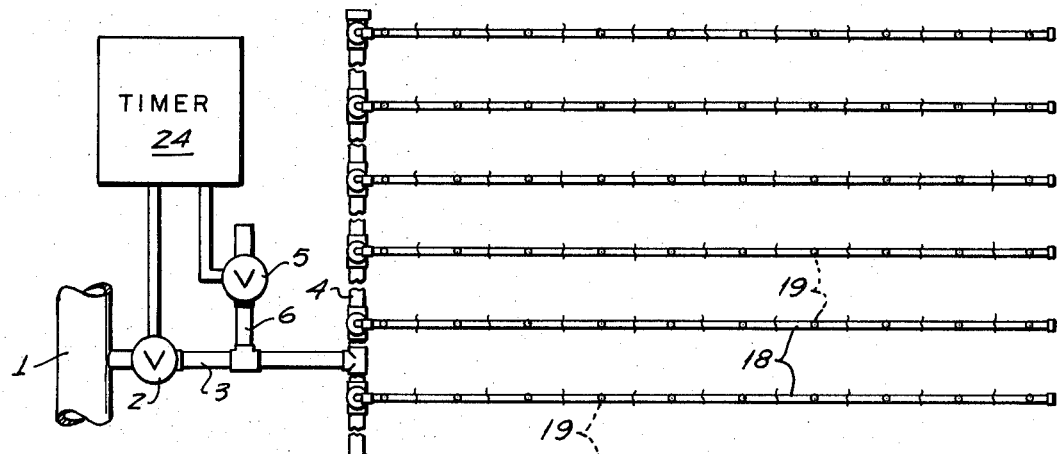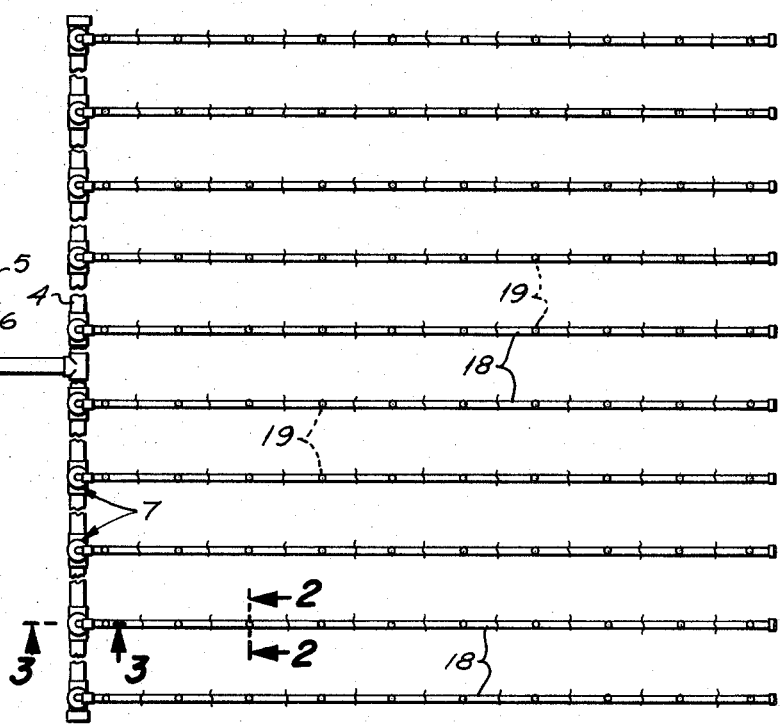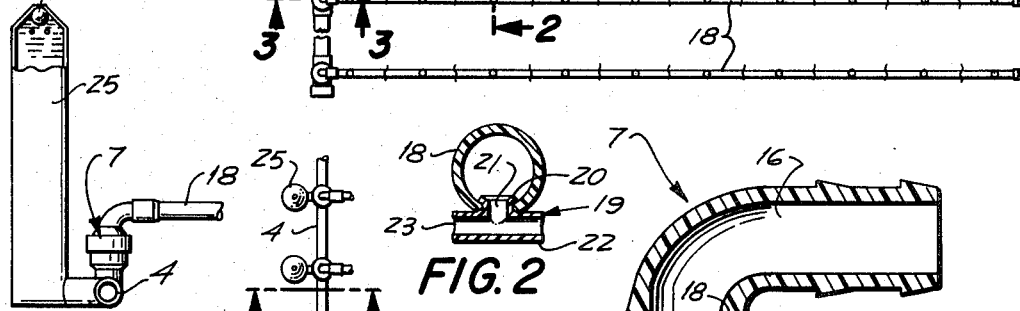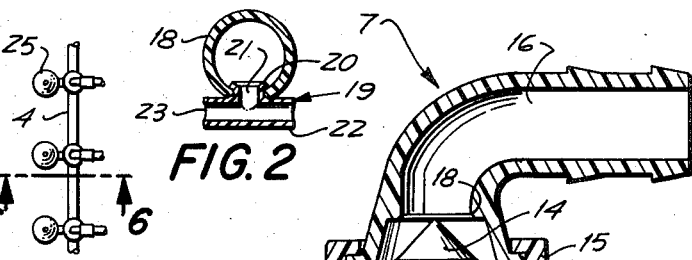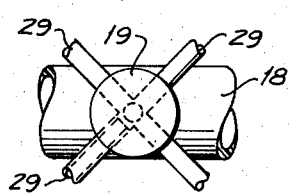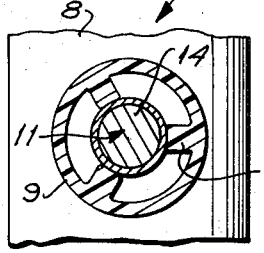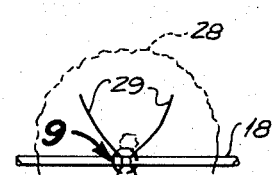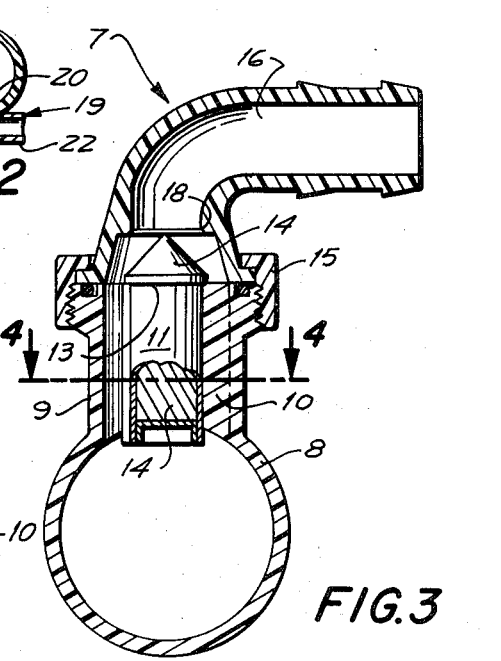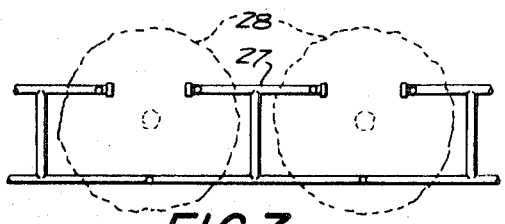

INTERMITTENT IRRIGATION SYSTEM

One embodiment involves an emitter system having pressure sensitive valves which are open below a predetermined pressure to effect a filling cycle and are closed above the predetermined pressure to effect a draining cycle, and a control system including a timer for alternately applying low and high pressure to produce alternate filling and draining cycles.

Another embodiment involves the inclusion of the emitter system in an otherwise standard sprinkler irrigation system in such a manner that by pressure control, the emitters may be operated to effect a drip irrigation operation or a sprinkler operation.

Another embodiment involves an electric control whereby units of the emitter system may be caused to undergo their filling cycles in sequence, terminated by pressure sensing switches which cause sequential draining cycles.

BACKGROUND OF THE INVENTION

While the development of the irrigation technique, known as "drip" or "trickle" irrigation is comparatively new, the benefits to be derived; namely, double crop yield with half the water requirement and minimal weed control has been firmly established. The benefits are so substantial even though clogging of the minute openings required to effect drip irrigation has required elaborate and expensive filtering systems as well as high maintainance costs. An exception is drip or trickle irrigation system utilizing self-flushing valves such as disclosed in my copending applications, Ser. Nos. 245,312 now U.S. Pat. Nos. 3,767,124 and 274,078.

SUMMARY OF THE INVENTION

The present invention is directed to an intermittent irrigation system having the advantages of drip or trickle irrigation systems, and is summarized in the following objects:

First, to provide an intermittent irrigation system wherein fixed emitter openings substantially larger than those required for drip or trickle irrigation are utilized so that particulate matter which would quickly clog a conventional emitter are readily flushed out; the emitter openings being intermittently in operation for extremely short periods so that during the irrigation period essentially the same volume of water (in the order of one or two gallons per hour) is discharged as would be discharged by a conventional drip or trickle emmiter.

Second, to provide an intermittent irrigation system wherein the emitter openings are connected by tubing of preselected diameters and lengths, and are so positioned that each emitter opening drains from a predetermined portion of the adjacent tubing and the size of the emitter openings are varied if needed to cause and essentially equal volumes of flow from the emitter openings during each draining cycle.

Third, to provide an intermittent irrigation system, an embodiment of which utilizes a supply system, in which the pressure is periodically raised and lowered, connected to an emitter system by pressure sensitive valves in such a manner that the valves are closed by raised pressure to permit the emitter system to undergo a drainage cycle and are opened by lowered pressure to permit the emitter system to undergo a filling or recharging cycle.

Fourth, to provide an intermittent irrigation system, an embodiment of which utilizes an electric means to initiate the filling cycles of emitter subsystems in sequence, and electric sensors to determine completion of the filling cycles and shut off corresponding emitter subsystems in sequence, and electric sensors to determine completion of the filling cycles and shut off corresponding emitter subsystems to initiate their draining cycles in sequence.

Fifth, to provide an intermittent irrigation system, a further embodiment of whic incorporates a sprinkler irrigation system and utilizes pressure responsive valves which close flow from the emitter openings at a predetermined pressure to permit sprinkler irrigation when the system pressure is above the predetermined pressure or permit intermittent emitter irrigation when the system pressure is below the predetermined pressure.

DESCRIPTION OF THE DRAWINGS

FIG. 1 is a diagrammatical view illustrating one embodiment of the intermittent irrigation system.

FIG. 2 is an enlarged transverse sectional view showing an emitter fitting.

FIG. 3 is an enlarged sectional view of a pressure sensitive valve for control of water to an emitter line.

FIG. 4 is a transverse sectional view taken through 4—4 of FIG. 3.

FIG. 5 is a fragmentary diagrammatical view of the intermittent irrigation system showing a modification thereof.

FIG. 6 is an enlarged fragmentary sectional view taken from 6—6 of FIG. 5.

FIG. 7 is an enlarged fragmentary diagrammatical view of the intermittent irrigation system illustrating one arrangement wherein branch emiiter lines are provided.

FIG. 8 is another enlarged fragmentary diagrammatical view illustrating another arrangement of branch emitter lines.

FIG. 9 is an enlarged fragmentary sectional view taken within circle 9 of FIG. 8.

Figure 10:
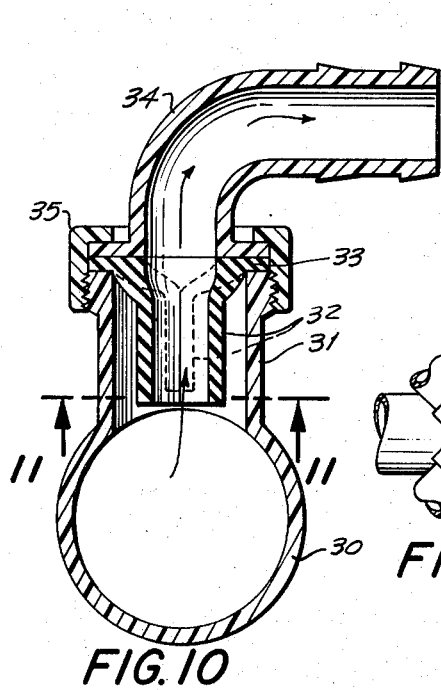
FIG. 10 is a sectional view similar to FIG. 3 showing a modified from of the pressure sensitive valve.

Reference is first directed to FIGS. 1 through 4. The intermittent irrigation system herein illustrated is supplied with water from a main line 1 through a main valve 2 which is joined through a connecting line 3 to a manifold line 4. A pressure relief valve 5 is preferably mounted on a riser 6 which may extend upwardly from the connecting line 3. The purpose of the relief valve is to reduce the pressure in the supply system downstream from the main valve 2 to some predetermined low value; for example in the range between five and fifteen pounds.

Spaced along the manifold line in accordance with the row spacing of a crop to be irrigated is a series of pressure sensitive valves 7, each valve 7 includes a T-housing 8 having an upwardly directed branch 9 provided with guide ribs 10 which a valve element 11, the upper end of which forms a valve head 12 having a stop flange 13. The valve element is preferably provided with a weighted core 14. Fitted over the housing 8 by means of a clamp ring 15 is an outlet elbow 16 having a valve seat 17. The valve 7 is intended to close at a predetermined low pressure a few pounds above the supply system low value pressure; for example ten pounds if the supply system low value pressure is five pounds.

The pressure sensitive valves 7 are connected to a corresponding series of emitter lines 18. There may be more than one emitter line for each valve 7 and the emitter lines may have branches. The emitter lines are perforated at intervals, the spacing being determined by the crop to be irrigated and other factors. Preferably each perforation receives an emitter fitting 19 having a flanged stem 20 dimensioned to be forced into a perforation. The stem is provided with a bore 21. The diameter of the bore may vary in size as one of several means to regulate flow in order to accomplish essentially uniform discharge from a plurality of emitters. For example, the diamerer of the bore 21 may range from below 0.075 to about 0.200. As the size is reduced, the need for filtering the water increases; and as the size is increased, the flow rate increases as the square of the diameter for a given pressure differential across the emitter opening. The indicated dimensions permit substantial compensation. To minimize a jet effect from a discharging stream of water, the emitter fitting includes a head 22 having a cross passage 23 equal to or larger than the bore 21. The emitter lines and emitter fittings constitute an emitter system.

The supply system includes a timer 24 which opens and closes the main valve 2 and pressure relief valve 5 in predetermined sequence.

Operation of the embodiment shown in FIGS. 1 through 4 is as follows:

Irrigation, controlled by the timer 24 is initiated by opening the main valve 2, so as to pressurize the manifold line 4 and close the pressure sensitive valves 7. Immediately after pressurizing, the main valve 2 is closed and the pressure relief valve 5 is opened. Assuming that the manifold line is essentially level, the height of the relief valve riser 6 determines the resulting reduced pressure in the supply system. This reduced pressure is below the closing pressure for the pressure sensitive valves 7 and permits the valves 7 to open and initiate a filling cycle in the emitter lines 18 which continues until water fills the emitter line to the remote emitter opening.

The capacity of the supply system is greater than the emitter system. Also the cumulative area of the emitter openings is substantially less than the area of the emitter line; for example, the cumulative area of the emitter openings is preferably in the order of one-half to two-thirds the area of the emitter line. Also the capacity of and total length of the emitter line is such as to minimize frictional losses so that the time interval required for filling the emitter line is minimized.

The filling cycle continues for the relatively short interval calculated to permit the emitter line to fill with water throughout its length; whereupon the water is shut off by closing the pressure relief valve 5 and opening the main valve 2 so that the supply system is pressurized to cause the pressure sensitive valve 7 to close. Care is taken to avoid air entrapment in the supply system which might cause excessive time delay in order to close the valves 7.

Closure of the valve 7 initiate a drainage cycle in which the water contained in the emitter lines drains out. Then after a predetermined dwell period the main valve 2 is closed and the relief valve 5 is opened to repeat the filling cycle.

Assuming that the emitter lines are horizontally disposed, that the filling cycle terminates when the water reaches the remote emitter opening, and that the openings are of equal size, the volume of water discharged during filling of the emitter line will diminish from the initial emitter opening to the remote emitter opening. This can be compensated for by increasing the size of the bores 21 of succeeding emitter openings.

The emitter openings are directed downward and preferably the connecting sections are arched slightly downwardly toward the emitter openings, so that, assuming that the emitter line size, emitter opening size and spacing of the outlets are constant, the volume discharged during the drainage cycle is uniform. However, these factors may be varied to compensate for the variation in flow during the filling cycle.

If the emitter system is located on sloping land so that the emitter lines slope downward, the increased head of water tends to provide progressive increase in flow volume during the draining cycle, thus compensating for the reverse condition during the filling cycle. If the slope is excessive, over compensation may occur requiring the use of progressively decreasing size of the emitter bores 21.

Reference is now directed to FIGS. 5 and 6. In order to provide sufficient capacity in the supply system, a series of upright reservoirs 25 may be provided. The reservoirs 25 require float valves 26 to bleed air and to close when the supply system is pressurized. Similar reservoirs may be located at various stations in the emitter system to increase compensating flow during the draining cycle.

Reference is now directed to FIG. 7 which indicates that the emitter lines may be provided with branch lines 27 as may be required to provide multiple outlets, such as may be required for trees 28, indicated by broken lines. Also for example, if, in the case of tree irrigation requiring several points of water discharge, the cross passage 23 of the emitter fitting 19 may receive a pair of small emitter tubes 29, or the emitter fitting may be provided with a pair of cross passages to accomodate four emitter lines as indicated in FIGS. 8 and 9.

Figure 11:
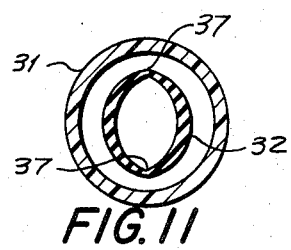
FIG. 11 is a transverse sectional view thereof taken through 11—11 of FIG. 10, showing the valve in its open position.
Figure 12:
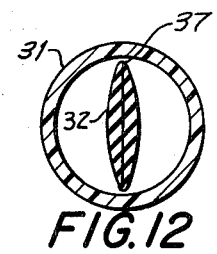
FIG. 12 is a transverse sectional view corresponding to FIG. 11 showing the valve in its closed position.

Reference is now directed to FIGS. 10, 11 and 12 which illustrates a modified form of the pressure responsive valve 7. In this construction a housing 30 is provided having a branch portion 31 which receives a normally tubular valve element 32 formed of elastomeric material. The valve element is provided with a flange 33 clamped between an outlet elbow 34 and a clamp ring 35. The valve element comprises two opposed arcuate walls 36 foldably connected abruptly along their side margins 37. The interior of the valve element is exposed to the inlet and outlet of the housing and elbow, while the exterior is exposed only to the inlet so that the side walls are collapsible into mutual sealing relation in response to external pressure as indicated in FIG. 12. The side walls are biased toward their arcuate shape and their resistance to collapse is determined by the hardness of the elastomer and their wall thickness.

It is sometimes desirable, particularly with tree crops, to provide for either sprinkler irrigation or drip irrigation. This is accomplished in FIGS. 13, 14 and 15 by incorporating sprinkler lines 38 into the emitter system. The sprinkler lines are provided with risers 39 which extend to tree top level and receive sprinkler heads 40. Usually one sprinkler head supplies several trees. For convenience of illustration, four trees 41 are indicated. The sprinkler lines 38 are provided at suitable locations, such as at the base of each riser 39 with an emitter line fitting 42 from which extend emitter line branches 43, such as the four branches shown in FIG. 13. Each emitter branch is provided with one or more emitter caps 44 having several outlet tubes 45.

Clamped within each cap 44 is a pressure shut off valve element 46 which may be similar, except for size to the valve element 32. The purpose of the valve elements 32 is to close off flow to the outlet tubes 45 at a pressure slightly below the operating pressure of the sprinkler heads 40. The sprinkler lines 38 are connected through the pressure sensitive valve 7 and manifold line 4, which, in turn joins the main line 1 through a connecting line 3 provided with a pressure relief valve 5, riser 6 and main valve 2. In addition, the sprinkler lines 38 are separately connected to the main line 1 through shut off valves 48.

Figure 14:
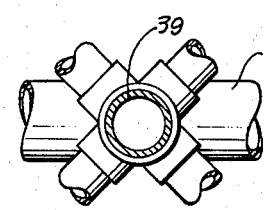
FIG. 14 is an enlarged sectional view of a sprinkler head riser and branch emitter lines taken within circle 14 of FIG. 13.
Figure 15:
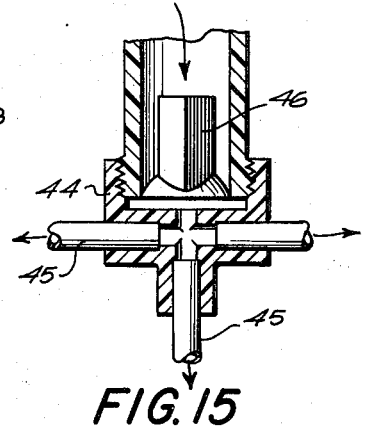
FIG. 15 is a fragmentary sectional view taken within circle 15 of FIG. 13 showing an emitter opening having a pressure sensitive valve.
Figure 13:
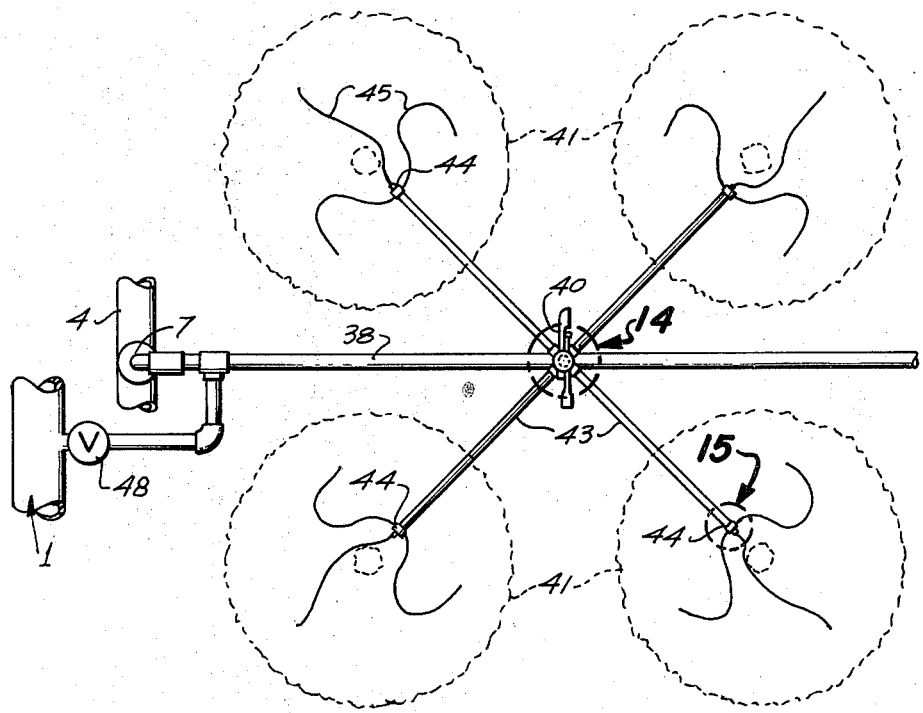
FIG. 13 is a fragmentary diagrammatical view showing an embodiment of the intermittent irrigation system which incorporates a sprinkler irrigation system.
Figure 16:
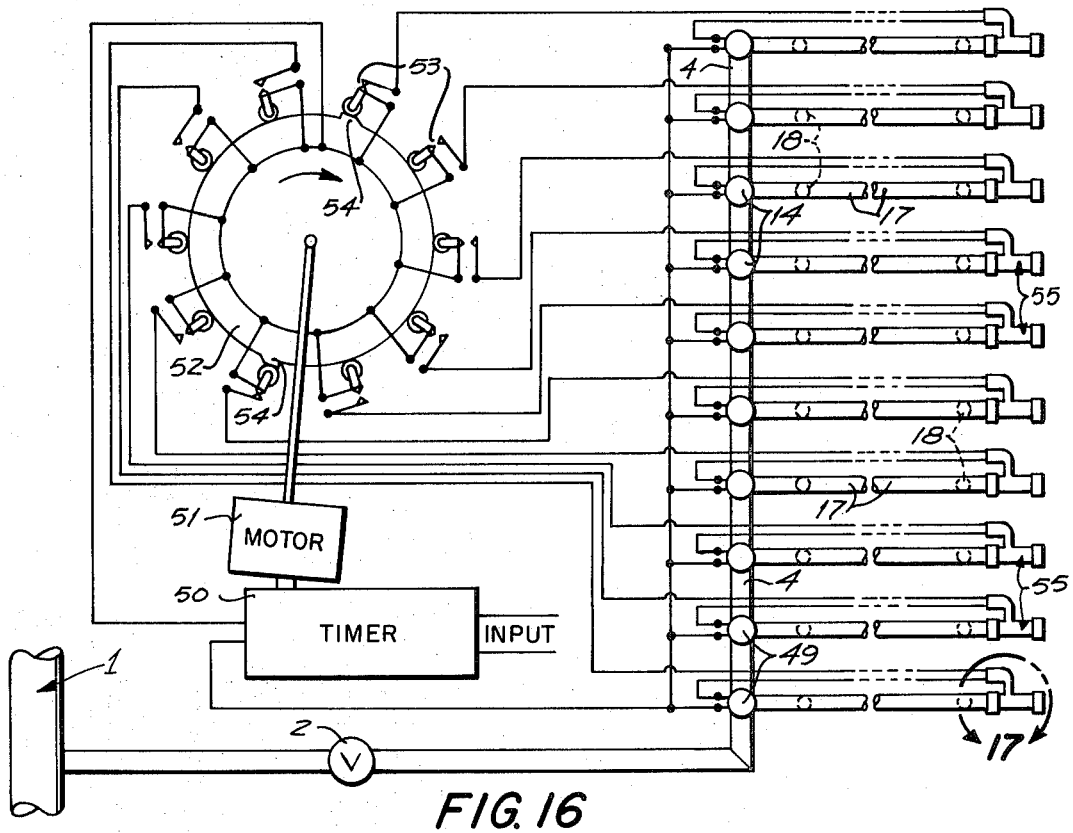
FIG. 16 is a diagrammatical plan view of a further embodiment of the intermittent irrigation system utilizing electric control means.
Figure 17:
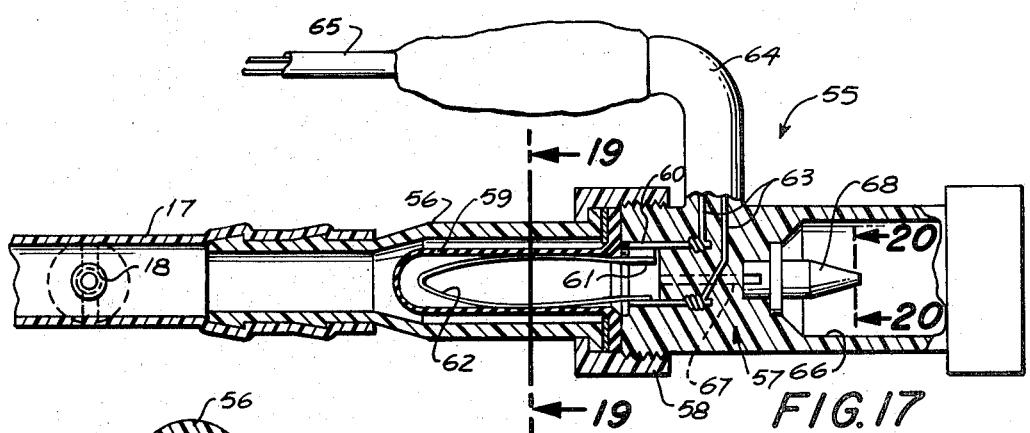
FIG. 17 is an enlarged fragmentary sectional view taken within circle 17 of FIG. 16 showing a pressure sensing switch in its open position.
Figure 19:
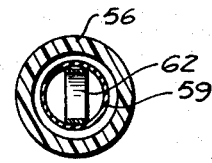
FIG. 19 is a transverse sectional view taken through 19—19 of FIG. 17.
Figure 18:
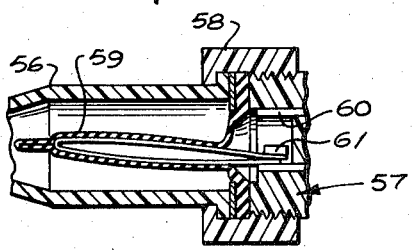
FIG. 18 is a similar view showing the switch in its closed position.
Figure 20:
FIG. 20 is an enlarged sectional view taken through 20—20 of FIG. 17.

Operation of the embodiment shown in FIGS. 13, 14, and 15 is as follows:

When it is desired to irrigate by sprinkler, water is supplied through valves 48 at a pressure substantially in excess of that supplied through the emitter supply system thus insuring that the emitter outlets are closed by the valves 46. When irrigation is desired in the drip or trickle manner, the valves 48 are closed and the supply system as disclosed in FIG. 1 through 4 is operated at pressures insufficient to reach the elevated sprinkler heads as well as insufficient to close the valves 46.

Reference is now directed to FIGS. 16 through 20 in which the intermittent irrigation system is electrically controlled. The supply system is connected to a main line 1 through a main valve 2 and is provided with a manifold line 4. The pressure relief valves are omitted and in place of the pressure sensitive valves 7 are solenoid operated valves 49.

A timer 50 drives a motor 51 which rotates a sequencing cam 52. The cam closes in sequence a set of normally open switches 53 corresponding to the valves 49 to close the solenoid valves 49 in sequence by means of one or more cam lobes 54. Each solenoid valve controls an emitter line 18 having a series of emitter fittings 19 as disclosed in FIG. 1.

Each emitter line is provided as its remote end with a normally closed pressure sensed switch 55. Each switch includes a tubular housing 56 and a switch containing body 57 by means of a clamp ring 58. Clamped between the housing 56 and the body 57 is the flanged end of a pressure sensitive envelope 59 formed of rubber or other elastomer, which extends into the housing. Exposed to the interior of the envelope is a fixed contact 60 and a movable contact 61, the movable contact being supported by a U-shaped contact spring 62 which extends into the envelope 59. The spring 62 and the fixed contact 60 are joined to conductors 63 which extend through a conductor branch 64 for connection to a lead line 65.

Formed with the switch body 57 is a closed surge chamber 66 which communitates with the interior of the envelope 59 through a passage 67 and a check valve 68. The check valve may be a conventional "duck bill" valve formed of rubber. The valve permits ready flow of air from the interior of the envelope to the chamber 66, but return flow is restricted by a small flow notch 69.

Operation of the pressure sensitive switch 55 is as follows:

When water flow through the emitter line 18 reaches the housing 56, its pressure collapses the envelope 59, opening the switch formed by the contacts 60 and 61. The air is displaced from the envelope 59 to the chamber 66 with slight increase in pressure as the chamber is substantially larger than the envelope. Subsequent drop in pressure in the housing, due to drainage of water from the emitter line, permits the contact spring 62 to spread drawing air back into the envelope, but the restricted flow notch 69 introduces a time delay.

Operation of the electrical intermittent irrigation system shown in FIGS. 16 through 20 is as follows:

The timer 50 initiates irrigation by opening the valve 2 and starting the motor 51. Initially, all the solenoid valves 49 and their corresponding pressure sensing switches 55 are closed. Rotation of the cam 52 causes one or more cam lobes 54 to close the switches 53 in sequence. Each switch 53 is in series with a corresponding switch 55 to cause the corresponding solenoid valve to open supplying water to its emitter line 18 and start a filling cycle. When the water reaches the extreme end of an emitter line, its switch 55 is caused to open, closing the corresponding solenoid valve to permit the emitter line to undergo its draining cycle. Reclosing of the switch 55 is delayed to permit the cam lobe to move past the corresponding switch 53.

While particular embodiments of this invention have been shown and described, it is not intended to limit the same to the details of the constructions set forth, but instead, the invention embraces such changes, modifications and equivalents of the various parts and their relationships as come within the purview of the appended claims.

Each of the embodiments is capable of permitting practice of a method whereby water is supplied at low pressure directly to the ground adjacent individual members of a crop for very short periods insufficient to cause run off. Between each period, the water supply is shut off to permit the previously supplied water to

I claim:

1. An intermittent irrigation system, comprising:
   a. an emitter line including a plurality of spaced emitter openings, the cumulative area of the emitter openings being less than the capacity of the emitter line;
   b. control means for filling and draining of the emitter line to effect intermittent discharge of water from the emitter openings;
   c. and a timer for controlling the cycle between filling and draining the emitter line, thereby to predetermine the total volume of water delivered during an irrigation period.

2. An intermittent irrigation system as defined in claim 1, wherein:
   a. the emitter openings are spaced, positioned and of such relative size as needed to discharge essentially equal volumes of water from the emitter line during drainage.

3. An intermittent irrigation system as defined in claim 1 wherein the control means comprises:
   a. a pressure sensitive valve disposed at the entrance end of the emitter line, the valve having an open position below a predetermined pressure and a closed position above said predetermined pressure;
   b. a water supply means, of greater volume than the emitter line, connected to the pressure sensitive valve;
   c. a shut off valve at the entrance end of the water supply means;
   d. and a pressure relief valve for the water supply means;
   e. and said timer periodically actuating the shut off valve to supply water at a pressure above the closing pressure of the pressure sensitive valve, thereby to permit drainage of the emitter line, and alternately actuates the pressure relief to drop the pressure in the water supply means to open the pressure sensitive valve, thereby to fill the emitter line.

4. An intermittent irrigation system as defined in claim 3, wherein:
   a. the water supply means includes an upwardly extending reservoir dimensioned to contain water augmenting the water available to fill the emitter line.

5. An intermittent irrigation system as defined in claim 1, wherein:
   a. the control means includes a pressure sensitive valve having an elastomeric tubular valve element normally forming a central passageway, the external surface of the valve element being exposed to inlet pressure, the valve being collapsible in response to external pressure above a predetermined pressure to close the emitter line thereby to permit the emitter openings to drain the emitter line, the valve element being biased to remain open below said predetermined pressure to permit filling of the emitter line.

6. An intermittent irrigation system as defined in claim 1, wherein the control means comprises:
   a. a solenoid valve at the entrance end of the emitter line;
   b. a switch for sensing a filled condition of the emitter line;
   c. a timer actuated switch;
   d. the timer actuated switch being operated to open the solenoid valve thereby to fill the emitter line, and the sensing switch thereafter operable to close the solenoid valve thereby to permit drainage of the emitter line.

7. An intermittent irrigation system as defined in claim 6, wherein:
   a. the sensing switch includes an elastomeric envelope extending into the emitter line and collapsible in response to pressure in the emitter line, a pair of contacts, and operating means in the envelope for effecting relative movement of the contacts upon collapse of the envelope.

8. An intermittent irrigation system as defined in claim 1, wherein:
   a. the emitter line includes a series of risers, each terminating in a sprinkler head;
   b. pressure sensitive valves control discharge from the emitter openings to stop flow therethrough, when the emitter line is subjected to a predetermined pressure sufficient to activate the sprinkler heads, and to permit flow through the emitter openings, when the emitter line is subjected to pressure below said predetermined pressure;
   c. said control means are operable below said predetermined pressure;
   d. and means is provided to supply water to the emitter line at a pressure above said preselected pressure to close the emitter openings and cause operation of the sprinkler heads.

9. An intermittent irrigation system as defined in claim 8, wherein:
   a. the pressure sensitive valve includes an elastomeric tubular valve element normally biased to form an open passageway, the valve element being collapsible in response to upstream pressure to stop flow therethrough.

10. An intermittent irrigation system, comprising:
    a. a plurality of emitter lines, each emitter line having a plurality of emitter openings, the cumulative area of the emitter openings in each emitter line being less than the capacity of the corresponding emitter line;
    b. control means causing the emitter lines to undergo alternate filling and drainage cycles to effect intermittent discharge of water from the emitter openings, the emitter openings being spaced, positioned, and of such relative size as to discharge essentially equal volumes of water during the drainage cycles;
    c. and a timer for controlling the spacing and duration of the filling and draining cycles of the emitter lines, thereby to predetermine the total volume of water discharged during an irrigation period.

11. An intermittent irrigation system as defined in claim 10, wherein the filling-draining means comprises:

a. a set of inlet valves for the emitter lines, the inlet valves adapted to close in response to inlet pressure above a predetermined pressure, thereby to permit the emitter line to undergo a draining cycle, and adapted to open in response to inlet pressure above said predetermined pressure thereby to permit the emitter lines to undergo a filling cycle;

b. and means controlled by said timer to apply inlet pressure to the inlet valves alternately above and below said predetermined pressure.

12. An intermittent irrigation system as defined in claim 10, wherein, the filling-draining means comprises:
   a. at least one solenoid valve for the emitter lines;
   b. a timer actuated switch operable to open the solenoid valve to initiate a filling cycle;
   c. and at least one sensing switch to detect completion of the filling cycle and close the solenoid valve to initiate a draining cycle.

13. An intermittent irrigation system as defined in claim 10, wherein:
   a. a set of solenoid valves, timer actuated switches and sensing switches are provided for sequential operation of the emitter lines.

14. An intermittent irrigation system as defined in claim 10, wherein:
   a. each intermittent line includes risers terminating in sprinkler heads;
   b. pressure response valves are included in the control means adapted to stop flow through the emitter openings in response to pressure in the emitter lines sufficient to cause operation of the sprinkler heads and to permit flow through the emitter openings at pressures in the emitter lines insufficient to cause operation of the sprinkler heads;
   d. and means is provided to select operation of the sprinkler heads or the emitter openings.

15. A pressure sensitive valve, comprising:
   a. housing having a valve chamber, an inlet and an outlet;
   b. a tubular elastomeric valve element in the valve chamber internally exposed to the outlet and inlet and externally exposed to the inlet only;
   c. the valve element having a pair of opposed, essentially arcuate side walls joined abruptly at diametrically opposite sides of the valve element, the side walls being relatively thin at their junctures thereby to permit folding of the side walls into mutual sealing contact, the side walls increasing in thickness from their junctures provide a predetermined resistance to pressure differential before being forced into mutual sealing contact.

16. A pressure sensitive switch for insertion into a fluid receiving tubular member, said switch comprising:
   a. a housing communicating with the tubular member;
   b. a collapsible elastomeric envelope within the housing, its exterior being exposed to pressure in the tubular member;
   c. a pair of relatively movable contacts exposed to the interior of the envelope;
   d. an operating means extending into the envelope and movable upon collapse of the envelope to actuate the contacts;
   e. means forming a closed chamber;
   f. a valve connecting the envelope and chamber, the valve means permitting ready flow into the sealed chamber on collapse of the envelope and restricted flow from the chamber to the envelope to provide a time delay.

17. A method of individually irrigating plants utilizing an irrigation system wherein each of a plurality of irrigation lines is provided with at least one outlet for each plant of a corresponding set of plants, characterized by:
   a. initiating flow of water at low pressure into at least one of the irrigation lines;
   b. terminating flow into the line when the ultimate plant of the corresponding set receives water;
   c. permitting water to drain from the line to each of the plants;
   d. and repeating the initiation, termination and drainage for a predetermined number of cycles.

* * * * *